(12) United States Patent
Willis et al.

(10) Patent No.: US 6,488,844 B2
(45) Date of Patent: Dec. 3, 2002

(54) OIL PAN INCLUDING A SNAP-FIT COVER AND REMOVABLE OIL FILTER ELEMENT

(75) Inventors: Todd M. Willis, Walled Lake, MI (US); Robert M. Waters, Canton, MI (US); John C. Kapcoe, Southgate, MI (US)

(73) Assignee: Federal-Mogul World Wide, Inc., Souhfield, MI (US)

(*) Notice: Subject to any disclaimer, the term of this patent is extended or adjusted under 35 U.S.C. 154(b) by 0 days.

(21) Appl. No.: 09/767,278

(22) Filed: Jan. 23, 2001

(65) Prior Publication Data

US 2002/0095763 A1 Jul. 25, 2002

(51) Int. Cl.[7] ............................................. B01D 35/027
(52) U.S. Cl. ........................ 210/172; 210/232; 210/451; 184/6.24; 184/106
(58) Field of Search ................................ 210/167, 168, 210/171, 172, 232, 495, 236, 451, 416.5; 184/6.24, 106; 123/195 C, 196 A

(56) References Cited

U.S. PATENT DOCUMENTS

| | | | |
|---|---|---|---|
| 1,305,355 A | 6/1919 | Gulick | |
| 1,587,600 A | 8/1926 | Salves | |
| 1,671,391 A | * 5/1928 | Winslow et al. | ............ 112/256 |
| 1,868,055 A | 7/1932 | Edwards | |
| 1,874,585 A | 8/1932 | Newcomb | |
| 1,892,185 A | 12/1932 | Clements | |
| 2,306,823 A | 12/1942 | Moldrum | |
| 2,437,006 A | 3/1948 | Doshren | |
| 3,211,256 A | 10/1965 | Taulsch | |
| 3,211,291 A | 10/1965 | Taulach | |
| 4,136,011 A | 1/1979 | Joseph et al. | |
| 4,264,443 A | 4/1981 | Anderson et al. | |
| 4,352,737 A | 10/1982 | Taniguchi | |
| 4,402,827 A | 9/1983 | Joseph | |
| 4,450,061 A | 5/1984 | Anderson et al. | |
| 5,099,854 A | 3/1992 | Kikuchi et al. | |
| 5,130,014 A | 7/1992 | Volz | |
| 5,314,616 A | 5/1994 | Smith | |
| 5,478,582 A | 12/1995 | Camping | |
| 5,607,637 A | 3/1997 | Boor et al. | |
| 5,863,424 A | 1/1999 | Lee | |
| 6,013,179 A | 1/2000 | Laughlin et al. | |
| 6,058,898 A | 5/2000 | Freeso | |

FOREIGN PATENT DOCUMENTS

| | | | |
|---|---|---|---|
| AU | 1912 | * of 1926 | ................ 210/168 |
| DE | 1217799 | 4/1966 | |
| DE | 1536800 | 3/1971 | |
| DE | 3123269 A1 | 6/1982 | |
| DE | 4242513 C2 | 2/1997 | |
| DE | 19610414 | 9/1997 | |
| DE | 19735444 A1 | 1/1999 | |
| DE | 19735445 A1 | 1/1999 | |
| DE | 19735444 C2 | 4/1999 | |
| DE | 19735445 C2 | 8/1999 | |
| DE | 19860357 A1 | 4/2000 | |
| GB | 2079168 a | 1/1982 | |

* cited by examiner

Primary Examiner—Matthew O. Savage
(74) Attorney, Agent, or Firm—Reising, Ethington, Barnes, Kisselle, Learman & McCulloch PC

(57) ABSTRACT

An oil reservoir for vehicle transmissions includes an oil pan, cover, and filter cartridge which are manufactured as separate components. The cover 14 is attached to the pan 12 preferably with a snap-fit connection. The filter cartridge 16 is releasably secured in position between the cover 14 and pan 12 so as to enable the module 16 to be installed and removed without having to disconnect the cover 14 from the pan 12.

21 Claims, 4 Drawing Sheets

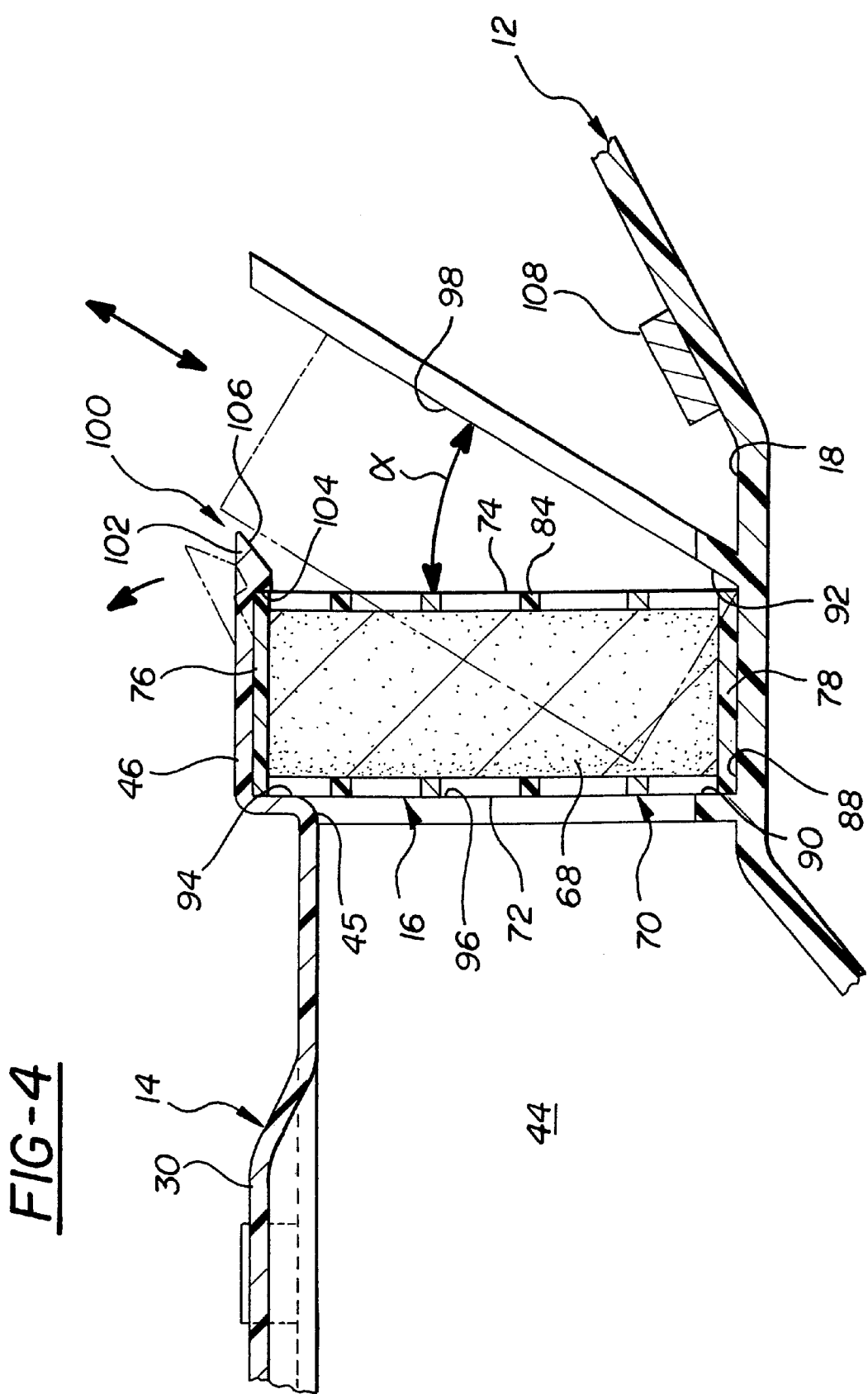

OIL PAN INCLUDING A SNAP-FIT COVER AND REMOVABLE OIL FILTER ELEMENT

BACKGROUND OF THE INVENTION

1. Technical Field

This invention relates generally to oil reservoirs for vehicle transmissions, and more particularly to those having an in-pan filter.

2. Related Art

Vehicular transmissions are typically equipped with an oil reservoir which includes an oil pan mounted at the bottom of the transmission to serve as a reservoir for lubricating oil. It is common also to incorporate within the interior of the oil pan a filter for cleaning the oil in the reservoir before being drawn back into the transmission. In some applications, the filter is provided as a separate, self-contained module having a filter medium encased by a filter housing which is supported off the floor of the pan. Replacement of a spent filter medium requires replacement of the entire module, including the housing. Other known constructions use the floor of the pan as the lower half of the filter housing and fix a cover permanently to the wall of the pan, with the filter medium being trapped between the cover and floor. In this arrangement, the filter medium is permanently attached to the cover and pan and is thus not replaceable without replacement of the entire oil pan. In both constructions, the upper housing portion or cover is fitted with an integrated flow tube which couples to a transmission oil pump for drawing filtered oil from beneath the cover into the transmission. Both the cover and pan are known to be made of plastics material.

It is an object of the present invention to simplify the construction and maintenance of the filter system for such oil reservoirs.

SUMMARY OF THE INVENTION AND ADVANTAGES

An oil reservoir according to the invention includes an oil pan, a cover mountable to the pan, and an oil filter cartridge formed separately from the pan and cover and supported in such manner between the cover and pan so as to be separable and removable therefrom to facilitate replacement of the filter cartridge without having to remove the cover from the pan.

According to another aspect of the invention, an oil reservoir is provided having an oil pan, a cover, and filter cartridge, wherein the cover is secured with a snap-fit connection to the pan and supports the filter cartridge releasably between the cover and pan in such manner as to enable separation and removal of the filter cartridge for replacement and/or installation without removal of the cover from the pan.

The invention further contemplates a method of manufacturing an oil reservoir including forming an oil pan, cover, and filter cartridge separately from one another, and securing the cover and filter cartridge to the pan in such manner that the cartridge is separable and removable for facilitating replacement of the cartridge without removing the cover from the pan.

The invention has the advantage of providing a oil reservoir of simple construction.

The invention has a further advantage of providing a reservoir having a replaceable filter module without requiring replacement of the other components, including the cover and pan.

Another advantage of the invention is that the filter module can be detached and separated from the pan and cover without having to remove the cover from the pan, thereby simplifying and reducing the cost and labor involved in replacing a spent filter module.

Another advantage of the invention is that the cover mounts with a snap-fit connection to the oil pan while still enabling removal and replacement of the filter module without removal of the cover, simplifying the manufacture and serviceability of oil reservoirs.

THE DRAWINGS

These and other features and advantages of the present invention will become more readily appreciated when considered in connection with the following detailed description and appended drawings, wherein:

FIG. 4 is an enlarged fragmentary sectional view of another portion of the reservoir.

DETAILED DESCRIPTION

Figure 1:
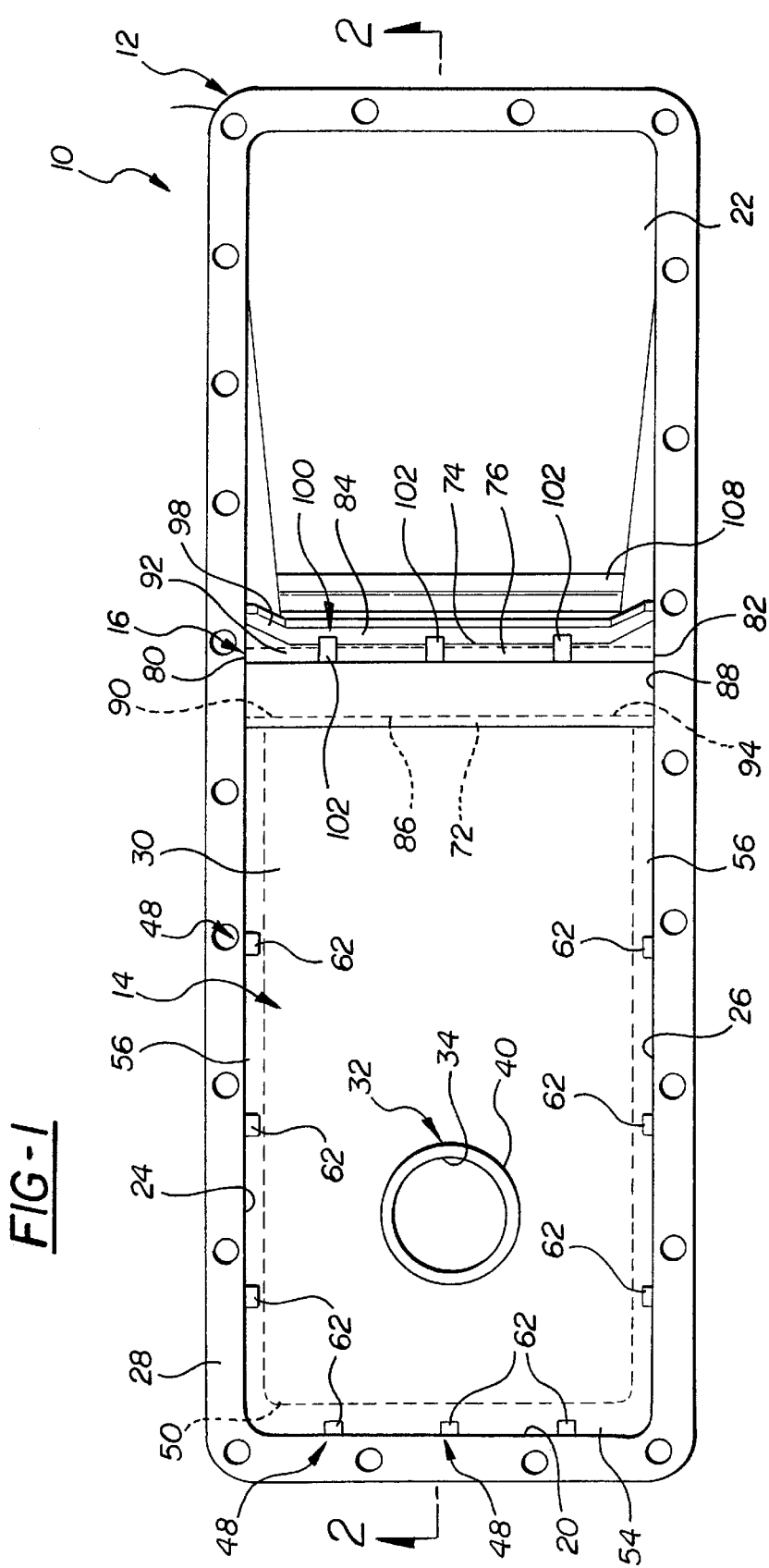
FIG. 1 is a plan view of an oil reservoir constructed according to the invention.

A reservoir constructed according to a presently preferred embodiment of the invention is shown generally at 10 in the drawings and includes three primary components, namely an oil pan 12, a cover 14, and a filter cartridge 16.

The oil pan 12 has a generally bowl-shaped configuration having a floor 18 extending longitudinally between a pair of end walls 20, 22 which are spaced from one another at opposite ends of the pan 12 and project upwardly from the floor 18. The floor 18 extends laterally across the pan 12 between laterally spaced side walls 24, 26 which also project upwardly from the floor 18. The walls 20, 22, 24, and 26 terminate at their upper ends in a mounting flange 28, which may be bolted or otherwise secured in usual manner to the underside of a transmission or the like for containing a supply of lubricating oil, such as transmission fluid. The pan 12 has a rigid construction and is preferably molded of a plastics material, such as glass-filled nylon or the like.

The cover 14 has a generally planar, solid, fluid-impermeable lid portion 30 through which a flow tube 32 extends, defining a flow passage 34 through the lid portion 30. A lower end portion 36 of the tube 32 extends below an underside surface 38 of the lid portion 30, and an upper end portion 40 projects above an upper surface 42 of the lid portion 30. The upper end portion 40 is adapted to be connected to a fluid pump for drawing transmission fluid through the flow tube for use in lubricating the transmission drive components. Preferably, the cover 14 is molded of plastics material and the flow tube 32 is preferably molded as one piece with the lid portion 30 so as to provide a single, unitary structure of the cover 14 separate and distinct from the oil pan 12 and filter cartridge 16.

The lid portion 30 of the cover 14 is supported by one of the end walls 20 and by the side walls 24, 26 above the underlying floor 18 of the oil pan 12 to enclose therewithin a space 44. The space 44 has an in-flow filter opening 45 adjacent one end 46 of the cover 14 opposite the end wall 20 of the pan 12, as shown best in FIGS. 2 and 4. As will be described in greater detail below, the opening 45 into the space 44 at the end 46 of the cover 14 defines an access opening for the entry of fluid into the space 44, with the remainder of the space 44 being walled off and sealed against fluid entry by the cover 14 and walls 18, 20, 24 and 26 of the oil pan 12. As will further be explained below, the filter cartridge 16 is installed across the opening 45 so as to require all fluid entering the space through the opening 45 to first pass through the filter cartridge 16.

Figure 2:
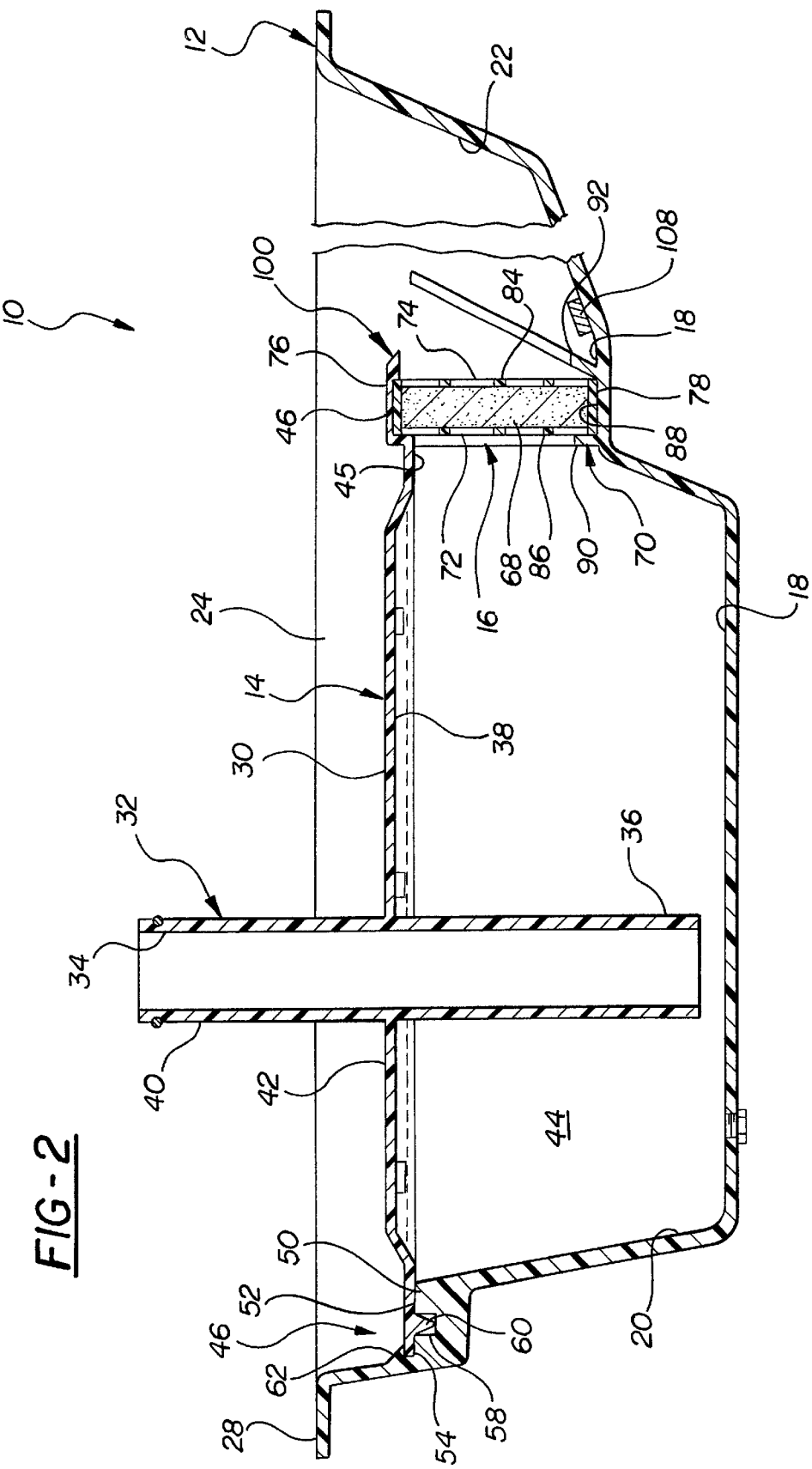
FIG. 2 is a fragmentary cross-sectional view taken generally along lines 2—2 of FIG. 1.
Figure 3:
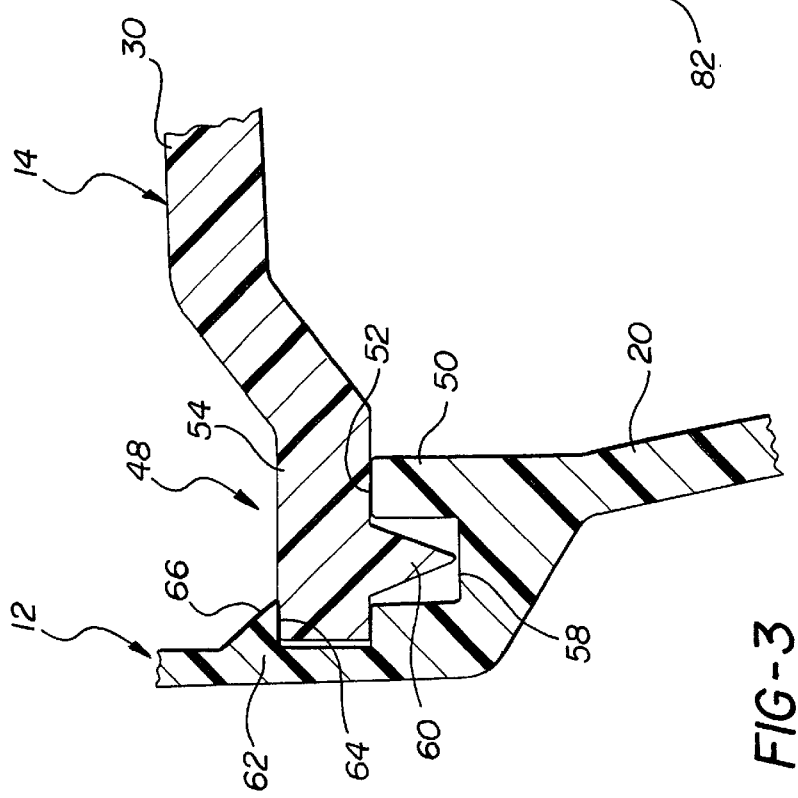
FIG. 3 is an enlarged fragmentary sectional view of a portion of the reservoir.

The cover 14 is preferably secured to the oil pan 12 with a snap-fit connection generally indicated at 48 in FIGS. 1–3. More particularly, and as best shown in FIG. 3, the end wall 20 and side walls 24, 26 are formed on their inner surface with a ledge 50 spaced above the floor 18 and below the mounting flange 28. The ledge 50 presents an upper surface 52 on which end 54 and side 56 portions of the cover 14 are supported. Preferably, the ledge 50 is formed along its length with a channel 58 which accommodates a continuous rib 60 extending along the end and side portions 54, 56 and projecting downwardly from the underside surface 38 of the cover 14. The rib 60 and channel 58 serve to positively locate the cover 14 relative to the pan 12 and secure the cover 14 against movement in the longitudinal or lateral directions of the pan 12.

The snap-fit connection 48 further includes a plurality of latch members 62 formed on the end wall 20 and side walls 24, 26 of the oil pan 12 adjacent the ledge 50. The latch members 62 have a locking shoulder 64 spaced above the ledge 50 by a distance approximately equal to the thickness of the cover 14 in the supported side and end portions 54, 56 supported on the ledge 50.

The latch members 62 preferably have a ramped camming surface 66 extending from the end wall 20 and side walls 24, 26 from a location above the locking shoulders 64 of the latch members 62 downwardly and inwardly at a ramp angle. The latch members 62 are operative to enable the cover 14 to be pressed down into the oil pan from above. The end and side portions 54, 56 are forced downwardly along and over the camming surfaces 66 of the latch members 62, whereupon the end and side portions 54, 56 come into engagement with the ledge 50 and the upper surface 42 of the cover is engaged along the end and side portions 54, 56 by the locking shoulders 64. The latch members 62 secure the cover 14 against removal once locked in place on the pan 12. However, the cover 14 can be removed if sufficient upward force is applied to overcome the holding force of the latch members 62, although as will become apparent below, there is no need to remove the cover 14 once installed in order to gain access to the filter module 16 for installation or removal purposes.

Referring to FIGS. 1, 2, 4 and 5, the filter cartridge 16 comprises a self-contained unit having a fluid-pervious filter medium 68 housed within a structural filter frame 70. The frame 70, like the oil pan 12 and cover 14, may be molded of a rigid plastics material such as nylon or the like. The filter cartridge 16 is supported on the floor 18 of the pan 12 in longitudinally spaced relation to the end wall 20 of the pan 12. The cartridge 16 has a filtered side 72 and an unfiltered side 74 opposite the filtered side 72. The sides 72, 74 are preferably parallel and planer. The cartridge 16 is preferably generally rectangular in shape and is supported across the open end 45 of the space 44, and as such extends upwardly from the floor 18 in transverse relation to the floor 18 and cover 14, and preferably particularly perpendicular to the cover 14. The filter cartridge 16 further extends laterally across the pan 12 between the opposing side walls 24, 26, and as such covers the full width and height of the opening 45, such that any fluid entering the space 44 through the opening 45 must pass through the filter cartridge 16.

Figure 5:
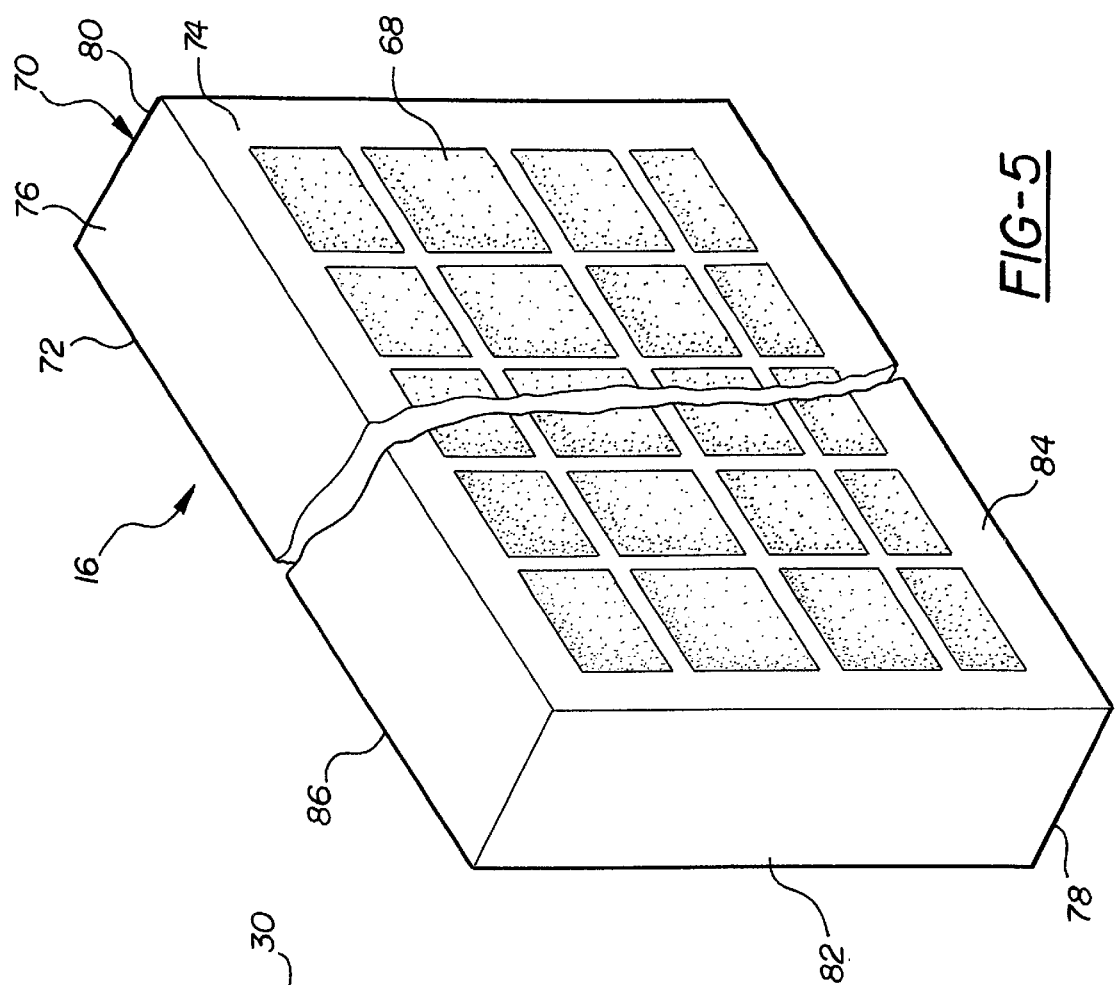
FIG. 5 is a fragmentary perspective view of the filter cartridge.

Referring to FIGS. 4 and 5 the filter frame 70 has an upper wall 76 engaging the cover 14, and a lower wall 78 engaging the floor 18 of the oil pan 12. The upper wall 76 and lower wall 78 are preferably continuous and solid so as to preclude fluid flow therethrough. The filter frame 70 further has side walls 80, 82 which are likewise preferably continuous and solid to preclude fluid flow therethrough and are in contact with the side walls 24, 26 of the oil pan 12. The filter frame 70 has front and back walls 84, 86, respectively, which are perforated to support and contain the filter medium 68 while accommodating the flow of transmission oil therethrough.

The oil pan 12 is formed on the floor 18 with a filter channel 88 for accommodating the filter cartridge 16. The channel 88 may be formed as a recess molded or cut into the floor or by a pair of spaced projections extending above the floor 18, as illustrated in FIGS. 1, 2, and 4. The channel 88 presents a shoulder 90 on the inboard filtered side 72 of the cartridge 16, and a shoulder 92 on the outboard unfiltered side 74 of the cartridge 16 which is spaced from the shoulder 90. The shoulder 90 limits movement of a filter cartridge 16 toward the end wall 20 and defines a fixed spatial relationship thereto.

As shown best in FIG. 4, the cover 14 is provided with an inboard shoulder 94 aligned with the shoulder 90 of the floor 18 and engaging the filtered side 72 of the filter cartridge 16 adjacent its upper end. The channel 88 preferably extends up the side walls 24, 26, such that each side wall 24, 26 is provided with a shoulder 96 supporting the inboard filtered side 72 of the filter cartridge 16 extending between the shoulder 90 of the floor 18 and the shoulder 94 of the cover 14. In this way, the filter cartridge 16 is framed on all four sides of the inboard filtered side 72 with continuous peripheral support, securing the filter cartridge 16 against inward movement toward the end wall 20 and further sealing the filter cartridge 16 about its perimeter against the passage of oil around the filter cartridge 16.

As shown best in FIGS. 1 and 4, the outboard shoulder 92 of the channel 88 in the floor 18 is inclined at a predetermined angle $\alpha$ away from the outboard unfiltered side 74 of the filter cartridge 16. The channel 88 includes associated shoulders 98 extending from the floor 18 up the side walls 24, 26 and at the same outward angle $\alpha$ as the outboard shoulder 92 extending across the floor 18. The angled shoulders 92, 98 enable the filter cartridge 16 to be dropped into the oil pan 12 at the angle $\alpha$, bringing the lower trailing edge corner of the cartridge 16 into engagement with the floor 18 of the oil pan 12 within the channel 88. See the broken chain line position of the filter cartridge 16 in FIG. 4. In this position, the filter cartridge 16 can be tipped forwardly toward the end wall 20, bringing the filter cartridge 16 into an upright position within the channel 88, with the inboard filtered side 72 engaging the shoulders 90, 94 and 96 (solid line position of FIG. 4).

As also shown best in FIGS. 1 and 4, the cover 14 extends at least partly over top of the filter cartridge 16 to restrain the filter cartridge 16 against upward movement away from the floor 18 of the oil pan 12. The cover 14 and filter cartridge 16 further preferably include a releasable snap-fit connection 100 operative to engage and support the filter cartridge 16 releasably in the upright position while enabling installation and removal of the filter cartridge 16 without removal of the cover 14 from the pan 12. The releasable snap-fit connection 100 for the cover 14 and filter module 16 preferably comprises at least one and more preferably at least two resilient latch fingers 102 (three shown) provided on the cover 14 which are operative to releasably engage the filter cartridge 16 when in the fully installed position. According to a preferred embodiment, each latch finger 102 projects beyond the end of the cover 14 and latches over the outboard upper edge of the upper wall 76 of the filter cartridge 16. The latch fingers 102 present a locking shoulder 104 spaced opposite the shoulder 94 of the cover 14 such that together, the shoulders 104, 94 trap the upper end of the filter cartridge 16 within a channel or recess defined between the shoulders 104, 94 to support the upper end of the filter cartridge 16 against tilting movement toward or away from the end wall 20.

The latch fingers 102 further preferably include a ramped surface 106 that extends upwardly and outwardly from the lock shoulder 104. The ramped surface 106 is confronted by the filter cartridge 16 upon tipping the filter cartridge 16 inwardly during installation from the broken chain line position shown in FIG. 4 toward the fully installed solid line position of FIG. 4. When so encountered, the reaction between the filter cartridge 16 and ramp surface 106 deflects the latch fingers 102 upwardly sufficiently to enable the upper end of the filter module 16 to pass by the ramped surface 106, at which point the latch fingers 102 self-return downwardly and latch over the trailing upper edge of the filter cartridge 16, as illustrated in the solid line position of FIG. 4.

If it is desired to remove the filter cartridge 16 once it is installed between the cover 14 and oil pan 12, one simply exerts a bodily lifting force on the ramped surfaces 106 of the latch fingers 102 to deflect them upwardly sufficiently to release the lock shoulder 104 (see broken chain line position of latch finger 102 in FIG. 4) and to enable the filter cartridge 16 to be bodily tipped outwardly to the broken chain line position of FIG. 4. It will be appreciated that disengagement of the filter cartridge 16 in this manner does not require any tampering with the cover 14. The cover 14 remains attached to the oil pan 12.

It will be appreciated from the foregoing description that the invention contemplates a method of manufacturing the reservoir 10 which includes forming the oil pan 12, cover 14, and filter cartridge 16 as separate components, securing the cover 14 to the oil pan 12 preferably with a snap-fit connection, and thereafter installing the filter cartridge 16 between the cover 14 and oil pan 12 in such manner that the filter cartridge 16 is releasable from the cover 14 and pan 12 without requiring removal of the cover 14 from the pan 12 for servicing or replacement.

A magnet 108 is secured to the floor 18 of the pan 12 adjacent the unfiltered side 74 of the filter module 16. The magnet 108 preferably comprises a strip of magnetic material which extends across the width of the floor 18 between the opposing side walls 24, 26 so as to entrap any magnetic metallic debris traveling along the floor 18 toward the filter cartridge 16.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. An oil reservoir for a vehicle comprising:
    an oil pan having a floor;
    a cover formed separately from said pan spaced above said floor and having a flow tube defining a fluid passage through said cover and a filter opening defined between said cover and said floor;
    an oil filter cartridge formed separately from said oil pan and said cover; and
    snap fit connections joining said cover to said oil pan and securing said oil filter cartridge in position between said cover and said oil pan within said filter opening, said oil filter cartridge being removable from said oil pan and said cover through said filter opening without removing said cover from said oil pan.

2. An oil reservoir for a vehicle comprising:
    an oil pan having a floor, an end wall extending upwardly from said floor, and a pair of side walls extending upwardly from said floor in spaced relation to one another;
    an oil filter cartridge having a filtered side and an opposite unfiltered side, said oil filter cartridge being supported in generally upright position on said floor of said oil pan with said filtered and unfiltered sides extending generally upwardly from said floor in spaced relation to said end wall of said oil pan such that said filtered side of said oil filter cartridge is generally facing and spaced from said end wall of said oil pan and said unfiltered side is facing generally away from said end wall of said oil pan; and
    a cover formed separately from said oil pan and said oil filter cartridge, said cover being secured to said oil pan and engaging said oil filter cartridge to support said oil filter cartridge in a filter opening defined between said cover and said floor, said oil filter cartridge being removable from said cover and said oil pan through said filter opening without removing said cover from said oil pan.

3. The reservoir of claim 2 wherein said cover includes at least one releasable latch engaging and releasably supporting said oil filter cartridge in said upright position on said floor of said oil pan.

4. The reservoir of claim 2 wherein said oil filter cartridge extends laterally between said side walls of said oil pan.

5. The reservoir of claim 4 wherein said oil pan includes a channel extending along said floor and supporting said oil filter cartridge.

6. The reservoir of claim 5 wherein said channel includes a first shoulder and a second shoulder disposed laterally adjacent said first shoulder, and wherein said first shoulder extends from said floor upwardly along said side walls to present a stop for said oil filter cartridge.

7. The reservoir of claim 6 wherein said cover extends at least partly over top of said oil filter cartridge.

8. The reservoir of claim 7 wherein said cover and said oil filter cartridge include a releasable latch device operative to engage and releasably secure said oil filter cartridge to said cover and to enable said disconnection and removal of said oil filter cartridge without removal of said cover from said oil pan.

9. The reservoir of claim 6 wherein said second shoulder of said channel is inclined from vertical away from said oil filter cartridge.

10. The reservoir of claim 9 wherein said second shoulder of said channel extends upwardly from said floor along said side walls at an outward angle relative to said oil filter cartridge.

11. The reservoir of claim 2 wherein said cover and said oil pan are joined by a snap fit connection.

12. The reservoir of claim 2 wherein said cover and said oil filter cartridge include a latch mechanism operative to secure said oil filter cartridge releasably to said cover.

13. The reservoir of claim 12 wherein said latch mechanism comprises at least one latch finger carried by said cover and releasably engaging said oil filter cartridge.

14. The reservoir of claim 13 wherein said latch finger is formed as one piece with said cover, and is elastically deflectable to an unlatched condition in response to application of an unlatching force and self-restoring to said latched condition upon removal of said unlatching force.

15. The reservoir of claim 14 wherein said latch finger includes a camming surface engagable by said oil filter cartridge during installation of said oil filter cartridge.

16. The reservoir of claim 2 wherein said flow tube is formed as one piece with said cover.

17. The reservoir of claim 2 wherein said oil pan and said cover are fabricated of plastics material.

18. The reservoir of claim 2 wherein said end wall and said side walls of said pan are formed with a ledge having latch portions adjacent thereto in spaced relation to said ledge, said cover having edge portions supportable by said ledge and engagable by said latch portions for securing said cover to said oil pan.

19. A three piece transmission oil pan and filter assembly comprising:

an oil pan fabricated of plastics material;

a filter cartridge formed as a separate structure from said oil pan; and a cover including a flow tube defining a flow passage through said cover formed separately from said oil pan and said filter cartridge of plastics material and secured with a snap-fit connection to said oil pan and supporting said filter cartridge in position within a filter opening defined between said cover and said oil pan, said oil filter cartridge being removable from said cover and said oil pan through said filter opening without removing said cover from said oil pan.

20. The assembly of claim 19 wherein said filter cartridge includes a lower edge supported by a floor of said oil pan and supported adjacent an upper edge thereof by said cover.

21. The assembly of claim 19 wherein said filter cartridge is removable from said cover and said oil pan without removing said cover from said oil pan.

* * * * *

UNITED STATES PATENT AND TRADEMARK OFFICE
CERTIFICATE OF CORRECTION

PATENT NO. : 6,488,844 B2
DATED : December 3, 2002
INVENTOR(S) : Todd M. Willis, Robert M. Waters and John C. Kapcoe It is certified that error appears in the above-identified patent and that said Letters Patent is hereby corrected as shown below:

Title page,
Item [56], References Cited, U.S. PATENT DOCUMENTS, change
"1,587,600 A   8/1926   Salves" to -- 1,587,800 A   6/1926   Salves --; change
"2,437,006 A   3/1948   Doshren" to -- 2,437,008 A   3/1948   Doehren --; change
"4,450,061 A   5/1984   Anderson et al" to -- 4,450,081 A   5/1984   Anderson et al --;
change "5,099,854 A   3/1992   Kikuchi et al." to -- 5,099,954 A   3/1992   Kikuchi et al --; change "5,478,582 A   12/1995   Camping" to -- 5,476,582 A   12/1995   Camping --.

Signed and Sealed this

First Day of April, 2003

JAMES E. ROGAN
*Director of the United States Patent and Trademark Office*